US010586088B2

(12) United States Patent
Mainguet et al.

(10) Patent No.: US 10,586,088 B2
(45) Date of Patent: *Mar. 10, 2020

(54) PYROELECTRIC SENSOR FOR THE DETECTION OF SKIN PRINTS

(71) Applicants: Commissariat à l'Energie Atomique et aux Energies Alternatives, Paris (FR); IDEMIA IDENTITY & SECURITY FRANCE, Courbevoie (FR)

(72) Inventors: Jean-François Mainguet, Grenoble (FR); Joel Yann Fourre, Marly-le-roi (FR); Josep Segura Puchades, Fontaine (FR)

(73) Assignees: COMMISSARIAT À L'ENERGIE ATOMIQUE ET AUX ENERGIES ALTERNATIVES, Paris (FR); IDEMIA IDENTITY & SECURITY FRANCE, Issy-les-Moulineaux (FR)

( * ) Notice: Subject to any disclaimer, the term of this patent is extended or adjusted under 35 U.S.C. 154(b) by 15 days.

This patent is subject to a terminal disclaimer.

(21) Appl. No.: 15/569,075

(22) PCT Filed: Apr. 27, 2016

(86) PCT No.: PCT/FR2016/050993
§ 371 (c)(1),
(2) Date: Oct. 24, 2017

(87) PCT Pub. No.: WO2016/174354
PCT Pub. Date: Nov. 3, 2016

(65) Prior Publication Data
US 2018/0137326 A1    May 17, 2018

(30) Foreign Application Priority Data

Apr. 30, 2015  (FR) ..................................... 15 53923

(51) Int. Cl.
*G06K 9/00*    (2006.01)
(52) U.S. Cl.
CPC ......... *G06K 9/0002* (2013.01); *G06K 9/0008* (2013.01)

(58) Field of Classification Search
CPC .. G06K 9/0002; G06K 9/0008; G06K 9/0004; G06K 9/00013; G06K 9/00053;
(Continued)

(56) References Cited

U.S. PATENT DOCUMENTS 5,193,911 A * 3/1993 Nix .......................... G01J 5/34
250/332
2003/0090650 A1  5/2003 Fujieda
(Continued)

FOREIGN PATENT DOCUMENTS

EP         2385486 A1    11/2011
WO     2015/008902 A1     1/2015

OTHER PUBLICATIONS

PCT International Search Report; International Application No. PCT/FR2016/050993; dated Jun. 23, 2016, 2 pages.
(Continued)

*Primary Examiner* — Mekonen T Bekele
*Assistant Examiner* — Michael J Vanchy, Jr.
(74) *Attorney, Agent, or Firm* — Moreno IP Law LLC

(57) ABSTRACT

The invention relates to a skin print sensor (120) comprising a plurality of elementary acquisition cells (121) which are arranged in and/or on a substrate and each of which includes: a pyroelectric conversion element (PYR) comprising first and second electrodes that are separated by a layer of pyroelectric material, the first electrode being connected to a node (GND) applying a reference potential of the sensor, and the second electrode being connected to a reading node (SN) of the cell; and a third electrode (EL) which is connected to the reading node (SN), is coated with a dielectric layer and is designed to form a capacitance along with the skin of a user.

12 Claims, 2 Drawing Sheets

(58) Field of Classification Search
CPC ....... G06K 9/0012; H01L 37/02; H01L 27/16; H01L 31/16; A61B 5/1172; H04N 5/3745; G01S 7/52085; G02F 1/13338; G06F 2203/04106; G06F 3/042; G06F 3/0421; G06F 3/043; G06F 3/044; G01J 5/34

See application file for complete search history.

(56) References Cited

U.S. PATENT DOCUMENTS

| | | | |
|---|---|---|---|
| 2009/0067684 A1* | 3/2009 | Mainguet | G06K 9/0002 382/124 |
| 2010/0084542 A1 | 4/2010 | Chou | |
| 2011/0280276 A1* | 11/2011 | Mainguet | G01J 5/024 374/102 |
| 2014/0028924 A1 | 1/2014 | Yamaguchi et al. | |
| 2014/0354597 A1 | 12/2014 | Kitchens, II et al. | |
| 2016/0123775 A1 | 5/2016 | Chen et al. | |
| 2018/0137325 A1* | 5/2018 | Mainguet | G06K 9/0002 |

OTHER PUBLICATIONS

PCT International Search Report; International Application No. PCT/FR2016/050992 dated Jun. 23, 2016, 2 pages.

* cited by examiner

PYROELECTRIC SENSOR FOR THE DETECTION OF SKIN PRINTS

The present patent application claims the priority benefit of French patent application FR15/53923 which is herein incorporated by reference.

BACKGROUND

The present application relates to fingerprint or palmprint sensors, and more generally to sensors of prints of skin portions. It more particularly aims at the field of pyroelectric sensors for the detection of prints of skin portions.

DISCUSSION OF THE RELATED ART

Various types of sensors have been provided to perform an electronic acquisition of a print of a skin portion, that is, to provide an image of the pattern formed by the ridges and valleys (or depressions) of the skin. Optical sensors, capacitive sensors, pyroelectric sensors, ultrasound sensors, and electric field sensors have in particular been provided.

Pyroelectric print sensors, that is, comprising a plurality of elementary acquisition cells (or pixels) are here more particularly considered, each cell comprising a pyroelectric conversion element comprising two electrodes separated by a layer of a pyroelectric material.

There is a need to at least partly improve certain aspects of known pyroelectric sensors.

SUMMARY

To achieve this, an embodiment provides a print sensor comprising a plurality of elementary acquisition cells arranged inside and/or on top of a substrate, each cell comprising: a pyroelectric conversion element comprising first and second electrodes separated by a layer of a pyroelectric material, the first electrode being connected to a node of application of a reference potential of the sensor, and the second electrode being connected to a sense node of the cell; and a third electrode connected to the sense node and coated with a dielectric layer, the third electrode being intended to form a capacitor with a user's skin.

According to an embodiment, in each cell, the third electrode is arranged so that only the dielectric layer separates the third electrode from a surface of the sensor intended to be placed in contact with a user's skin.

According to an embodiment, in each cell, the third electrode is arranged on the side of the pyroelectric layer opposite to the substrate.

According to an embodiment, in each cell, the third electrode is connected to the sense node via a conductive via crossing the pyroelectric layer.

According to an embodiment, the dielectric layer has a thickness smaller than 50 μm and preferably smaller than 2 μm.

According to an embodiment, the second and third electrodes are confounded.

According to an embodiment, in each cell, the first electrode is connected to a network of conductive tracks arranged on the side of the pyroelectric layer opposite to the substrate via a conductive via crossing the pyroelectric layer.

According to an embodiment, each cell further comprises a reset transistor coupling the sense node to a node of application of a reset potential.

According to an embodiment, in each cell, the sense node is coupled to an output track of the cell via a transistor assembled as a follower source and a readout transistor.

According to an embodiment, the sensor further comprises a controllable heat source.

BRIEF DESCRIPTION OF THE DRAWINGS

The foregoing and other features and advantages will be discussed in detail in the following non-limiting description of specific embodiments in connection with the accompanying drawings, among which.

DETAILED DESCRIPTION OF THE PRESENT EMBODIMENTS

Figure 1:
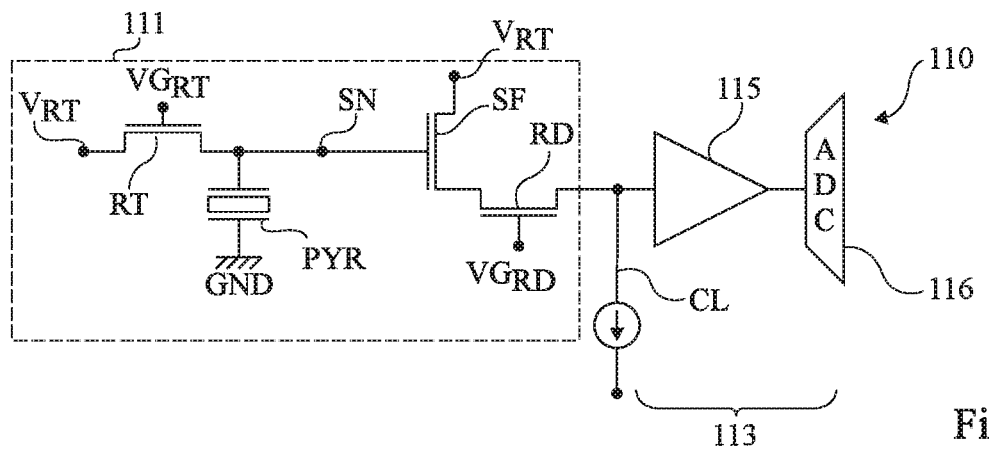
FIG. 1 is an electric diagram illustrating an example of a pyroelectric print sensor.

The same elements have been designated with the same reference numerals in the different drawings and, further, the various drawings are not to scale. For clarity, only those elements which are useful to the understanding of the described embodiments have been shown and are detailed. In particular, the peripheral control circuits of the elementary cells of the described print sensors have not been detailed, the forming of such circuits being within the abilities of those skilled in the art on reading of the present description. Further, when architectures of elementary cells, of arrays of elementary cells, or of print sensors are described, term "connected" is used to designate a direct electric connection, with no intermediate electronic component, for example, by means of one or a plurality of conductive tracks and/or of one or a plurality of conductive vias, and term "coupled" is used to designate a direct electronic connection (then meaning connected) or via one or a plurality of intermediate components, for example, via a transistor. Further, in the following description, when reference is made to terms qualifying absolute positions, such as terms "front", "rear", "top", "bottom", "left", "right", etc., or relative positions, such as terms "above", "under", "upper", "lower", etc., or to terms qualifying directions, such as terms "horizontal", "vertical", etc., it is referred to the orientation of the drawings. Unless otherwise specified, expressions "approximately", "substantially", and "in the order of" mean to within 10%, preferably to within 5%.

FIG. 1 is an electric diagram illustrating an example of a pyroelectric print sensor 110. Sensor 110 comprises a plurality of identical or similar elementary acquisition cells 111. Cells 111 are for example made in TFT ("Thin Film Transistor") technology on a dielectric support substrate, or inside and on top of a single-crystal semiconductor substrate, for example, a silicon substrate. The substrate surface having the elementary acquisition cells 111 of the sensor arranged on its side will be called hereafter upper surface of the substrate, by convention. For simplification, a single cell 111 has been shown in FIG. 1.

Each cell 111 comprises a pyroelectric conversion element PYR comprising two conductive layers or electrodes, for example, metallic, separated by a layer of a pyroelectric material, for example, aluminum nitride (AlN), zinc oxide (ZnO), a polymer such as polyvinylidene fluoride (PVDF) or one of its copolymers, for example, PVDF-TrFE (trifluoroethylene) having a pyroelectric coefficient in the order of 30 $\mu C/m^2/K$, a PZT-type (lead zirconium titanium) ceramic material, having a pyroelectric coefficient in the order of 350 $\mu C/m^2/K$, or a TGS- (Triglycine sulfate) or $LiTaO_3$-type crystalline element. A first electrode of pyroelectric conversion element PYR is connected to a capacitive sense node SN of the cell, the second electrode of element PYR being connected to a node of application of a reference potential GND, for example, the ground.

In practice, the capacitance of node SN comprises the capacitance of pyroelectric conversion element PYR, to which are added the stray capacitances of one or a plurality of transistors of the cell connected to node SN. In the shown example, each cell 111 comprises a reset transistor RT coupling its sense node SN to a node of application of a reset potential $V_{RT}$, for example, a potential which is positive with respect to the potential of node GND. Each cell 111 further comprises a transistor SF assembled as a follower source, having its gate connected to node SN, and a readout transistor RD coupling the source of transistor SF to an output track CL of the cell. The drain of transistor SF is coupled to a node of application of a reference potential, for example, potential $V_{RT}$ or another potential greater than potential GND. The control gate of transistor RT is connected to a node $VG_{RT}$ of application of a control potential of this transistor and the gate of transistor RD is connected to a node $VG_{RD}$ of application of a control potential of this transistor.

Output track CL of cell 111 is connected to an output stage 113 of the sensor. In this example, output stage 113 comprises an amplifier 115 having an input coupled to track CL and having its output coupled to an analog-to-digital converter 116 (ADC). Amplifier 115 is optional, and may in particular be omitted if the potential level of track CL is compatible with the input of analog-to-digital converter 116.

Sensor 110 further comprises a heat source, not shown. As an example, the heat source may comprise a network of heating resistors regularly distributed across the sensor surface. As an example, the heat source comprises one resistor per elementary cell, the resistor being arranged in the vicinity of the pyroelectric element of the cell. The resistors of the heat source are for example arranged on the same side of the substrate as cells 111, that is, on the upper surface side of the substrate. More generally, any heat source capable of heating pyroelectric conversion elements PYR of the sensor may be used. As an example, the heat source may be an optical heating source. If the substrate is transparent, the source can then be arranged on the substrate side opposite to cells 111. The heat source may for example comprise light-emitting diodes, a laser, a xenon flash, etc. The radiation emitted by the source is absorbed by the electrodes and/or the pyroelectric layer, thus generating heat. An advantage of a heating of this type is that the heat source may be relatively distant from acquisition cells 111, which enables to decrease electromagnetic couplings. Further, it is possible, by selecting an adapted wavelength, to directly heat the pyroelectric material across its volume.

Sensor 110 operates as follows. The user having placed a skin portion (for example, a finger) on or above the upper surface of the sensor (on the side of cells 111), the heat source of the sensor is turned on and heats pyroelectric conversion elements PYR, which accordingly generate electric charges on sense nodes SN of the corresponding cells 111. The quantity of heat received by each pyroelectric conversion element PYR when the heat source is turned on is greater when the corresponding cell is topped with a skin valley than when it is topped with a ridge. Indeed, when the cell is topped with a ridge, the skin (which is a relatively good heat conductor) absorbs a more significant part of the heat emitted by the source than when the cell is topped with a valley. Thus, when a cell is topped with a skin valley, the quantity of electric charges generated on its sense node SN is greater than when the cell is topped with a ridge.

During a phase of acquisition of an image point of a print by a cell 111, sense node SN of the cell is first reset via transistor RT of the cell. Transistor RT is then turned off and, during an integration period, charges generated by pyroelectric conversion element PYR accumulate on sense node SN of the cell, which varies the potential thereof. At the end of the integration, the potential of sense node SN is transferred onto output track CL of the cell via transistors SF and RD. To achieve this, transistor RD of the cell is then turned on. The potential of output track CL is then read out by the output stage 113 associated with output track CL. The potential of the sense node may also be read out after the resetting and before the beginning of the integration, the output value of the pixel then being the difference between the reference value read before the integration and the value read after the integration.

Preferably, during an acquisition, the heat source is controlled to generate a heat pulse, and the cells are read from some time after the beginning of the pulse, and/or little after the end of the pulse, to do away with thermalization phenomena causing, over time, the uniformization of the charge levels accumulated on the sense nodes SN of the different cells.

As an example, a plurality of elementary cells 111 may be connected to a same output track CL and share a same output stage 113 of the sensor. Cells 111 are for example arranged in an array of rows and columns, the cells of a same column being connected to a same output track CL and to a same output stage 113, and the cells of different columns being connected to different output tracks CL and to different output stages 113. As an example, cells 111 are simultaneously controllable row by row, that is, the cells 111 of a same row have their nodes $VG_{RT}$, respectively $VG_{RD}$, connected to a same control track and the cells 111 of different rows have their nodes $VG_{RT}$, respectively $VG_{RD}$ connected to different control tracks. Preferably, the heat source is then controllable to heat cells 111 row by row. This enables to perform a row-by-row scanning of the sensor by synchronizing the turning on of the heat source with the cell reading, and thus to minimize the effects of thermalization on the acquired image. In this case, the heat source may be formed of conductive tracks extending along the sensor rows, for example, metal tracks (for example, made of molybdenum or of aluminum), tracks made of a metal oxide, possibly transparent (for example, made of indium tin or indium zinc oxide), polysilicon tracks, or tracks made of a conductive polymer.

In practice, it can be observed that with sensors of the type described in relation with FIG. 1, in certain conditions of use or for certain skin types, it may be difficult to acquire images of good quality, that is, enabling to properly discriminate ridges from valleys of the skin. In fact, it can be observed that, in certain cases, the output value of a cell topped with a ridge of the skin is very close to the output value of a cell topped with a valley of the skin, which makes it difficult to exploit images acquired by the sensor.

According to an aspect of an embodiment, it is provided to amplify the voltage level difference on sense node SN between a cell topped with a ridge of the skin and a cell topped with a valley of the skin, by connecting to sense node SN an electrode coated with a dielectric layer, this electrode being arranged to form a capacitance with the user's skin.

Figure 2:
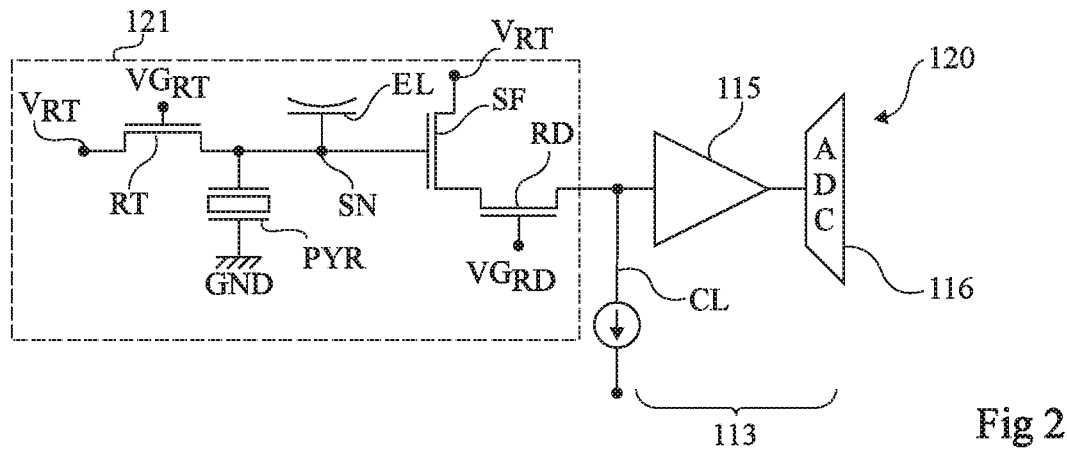
FIG. 2 is an electric diagram illustrating an embodiment of a pyroelectric print sensor.

FIG. 2 is an electric diagram illustrating an embodiment of a pyroelectric print sensor 120. Sensor 120 of FIG. 2 comprises elements common with sensor 110 of FIG. 1. These elements will not be described again. Sensor 120 differs from sensor 110 mainly in that, in sensor 120, elementary acquisition cells 121 replace elementary acquisition cells 111 of sensor 110. Elementary cells 121 of the sensor of FIG. 2 comprise the same elements as elementary cells 111 of the sensor of FIG. 1, connected substantially in the same way, and differ from elementary cells 111 of the sensor of FIG. 1 in that each cell 121 of the sensor of FIG. 2 further comprises an electrode EL coated with a dielectric layer, intended to form a capacitance with a user's skin, this electrode being connected to sense node SN of the cell. Electrode EL is placed in the vicinity of the upper surface of the sensor, so that only one dielectric layer (which may be a stack of a plurality of dielectric layers), for example, a layer having a thickness smaller than 50 µm and preferably smaller than 2 µm, separates electrode EL from the upper surface of the sensor, that is, the surface against which the user's finger is pressed during an acquisition. In particular, electrode EL is preferably arranged on the side of the pyroelectric layer opposite to the substrate (that is, above the upper surface of the pyroelectric layer).

The sensor of FIG. 2 may be controlled identically or similarly to what has been described in relation with FIG. 1.

The sensor of FIG. 2 has the advantage of allowing a better discrimination between ridges and valleys of the skin than a sensor of the type described in relation with FIG. 1. Indeed, on acquisition of an image of the print of the skin portion arranged on the upper surface of the sensor, the capacitance of sense node SN is not the same in all sensor cells, since it includes the capacitance obtained between electrode EL and the user's skin, which varies according to whether the cell is topped with a valley or with a ridge of the skin. In the case where a cell is topped with a valley of the skin, that is, where the skin is relatively distant from electrode EL, the capacitance formed between electrode EL and the skin is lower than when the cell is topped with a ridge of the skin. Thus, the capacitance of sense node SN is lower in a cell 121 topped with a valley of the skin than in a cell topped with a ridge of the skin. In other words, the charge-to-voltage conversion factor is higher in a cell 121 topped with a valley of the skin than in a cell topped with a ridge of the skin. Now, during a thermal reading, the quantity of charges generated by the pyroelectric element is higher in a cell topped with a valley of the skin than in a cell topped with a ridge of the skin. The presence of electrode EL, forming with the user's skin a capacitance which adds to the capacitance of node SN, thus results in amplifying the potential difference desired on node SN between cells topped with a ridge and cells topped with a valley of the skin (since the presence of a valley generates more charges on a lower capacitance, and thus a high potential difference than in the case of a ridge, with less charges and a higher capacitance).

In practice, the cell may be formed so that the electrode of element PYR connected to sense node SN of the cell is arranged in the vicinity of the upper surface of the sensor and is separated from the upper surface of the sensor only by a dielectric layer, for example, having a thickness smaller than 50 µm, and preferably smaller than 2 µm. In this case, electrode EL may be confounded with the electrode of element PYR connected to sense node SN.

Figure 3:
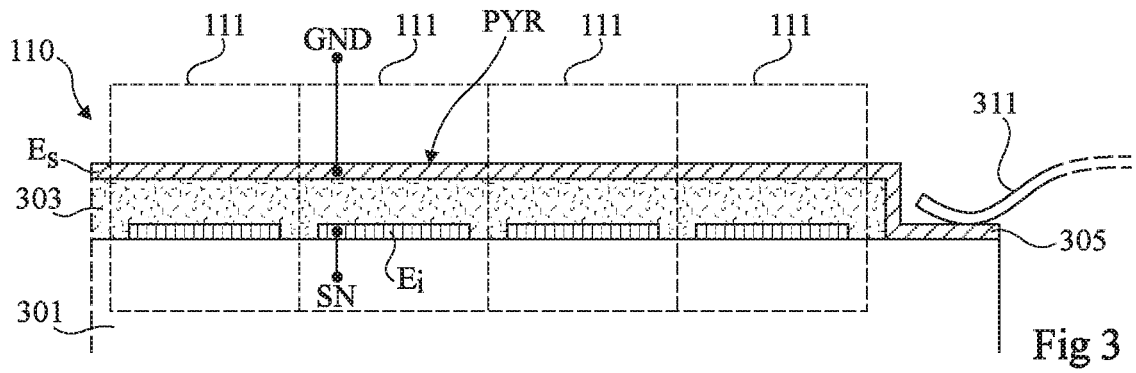
FIG. 3 is a cross-section view illustrating an embodiment of a pyroelectric print sensor of the type described in relation with FIG. 1.

FIG. 3 is a simplified cross-section view illustrating an embodiment of a pyroelectric print sensor 110 of the type described in relation with FIG. 1.

Cells 111 of the sensor are formed inside and/or on top of a substrate 301, for example, a dielectric substrate or a semiconductor substrate. In FIG. 3, only four cells 111 of the sensor have been shown. Further, in FIG. 3, in each cell 111, only the pyroelectric element PYR of the cell has been shown. Transistors RT, SF, and RD of cells 111, not shown in FIG. 3, are for example formed on the upper surface of substrate 301 in the case of a TFT-type technology, or inside and on top of substrate 301 in the case of a technology of single-crystal silicon type.

In each cell 111, pyroelectric conversion element PYR is arranged above the upper surface of substrate 301, and comprises, in the following order from the upper surface of substrate 301, a lower electrode $E_i$ connected to sense node SN of the cell, a layer 303 made of a pyroelectric material, and an upper electrode $E_s$ connected to the node of application of reference potential GND.

In practice, in this example, pyroelectric layer 303 and upper electrode layer $E_s$ are continuous layers substantially coating the entire surface of the sensor, and lower electrode layer $E_i$ is a discontinuous layer (that is, lower electrodes $E_i$ of the pyroelectric conversion elements PYR of the different cells 111 are not interconnected).

In the vicinity of an edge of the sensor, upper electrode layer $E_s$ is connected to a metal plate 305 intended to be welded to an external connection element 311, for example, a conductive wire. Metal plate 305 is arranged opposite a surface of substrate 301 which is not coated with pyroelectric layer 303. Such a layout enables to ease the welding between plate 305 and element 311. Indeed, such a welding would be more difficult to achieve if connection plate 305 was arranged above pyroelectric layer 303, due to the relative flexibility of layer 303 (particularly in the case of PVDF, which has the consistency of a soft plastic material).

Figure 4:
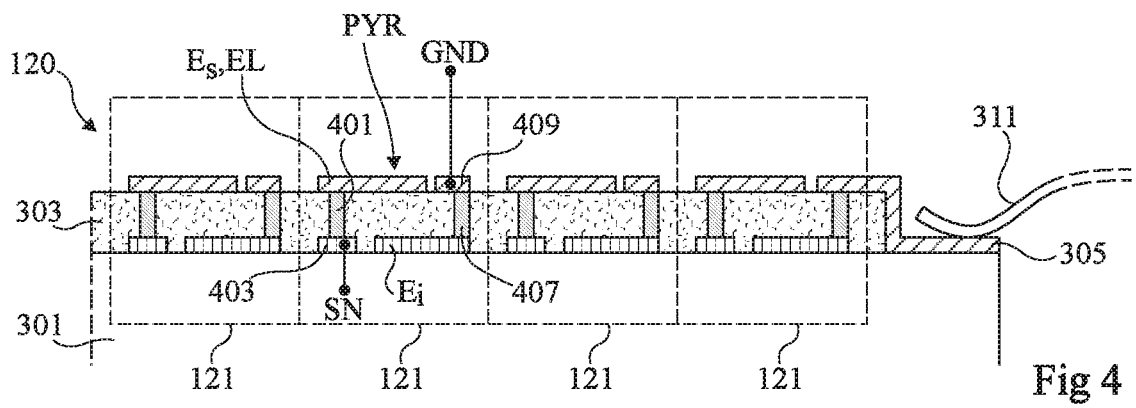
FIG. 4 is a cross-section view illustrating an embodiment of a pyroelectric print sensor of the type described in relation with FIG. 2.

FIG. 4 is a simplified cross-section view illustrating an embodiment of a pyroelectric print sensor 120 of the type described in relation with FIG. 2.

In the same way as in the example of FIG. 3, cells 121 of the sensor are formed inside and/or on top of a substrate 301, for example, a dielectric substrate or a semiconductor substrate. In FIG. 4, only four cells 121 of the sensor have been shown. Further, as in the example of FIG. 3, transistors RT, SF, and RD of the cells have not been shown.

In each cell 121, pyroelectric conversion element PYR is arranged above the upper surface of substrate 301 and comprises a stack comprising, in the following order from the upper surface of substrate 301, a lower electrode $E_i$, a layer 303 made of a pyroelectric material, and an upper electrode $E_s$. Electrodes $E_i$ and $E_s$ are formed in separate conductive levels, and are respectively in contact with the lower surface and with the upper surface of layer 303.

Upper electrode $E_s$ is connected to sense node SN of the cell via a conductive via 401 crossing layer 303 and a conductive region 403 formed in the same conductive level as lower electrode $E_i$, but not connected to electrode $E_i$.

Lower electrode $E_i$ is connected to node GND of application of the reference potential of the sensor. In the shown example, lower electrode $E_i$ is connected, via a conductive via 407 crossing layer 303, to a network 409 of interconnected conductive tracks formed in the same conductive level as upper electrodes $E_s$, but not connected to electrodes $E_s$. Conductive track network 409 for example forms a grid separating, in top view, the pyroelectric conversion elements PYR of the different cells. Conductive track network 409 is itself coupled to metal plate 305 of connection to the outside.

An advantage of this arrangement is that conductive track network 409 placed in the vicinity of the upper surface of the sensor enables to protect the sensor against possible electrostatic discharges.

In this example, in each cell 121, upper electrode $E_s$ of pyroelectric conversion element PYR is confounded with electrode EL intended to form a capacitor with the user's skin. In each cell 121, electrode $E_s$ is coated with a dielectric layer, not shown in FIG. 4, forming the dielectric of the capacitor formed with the skin.

Figure 5:
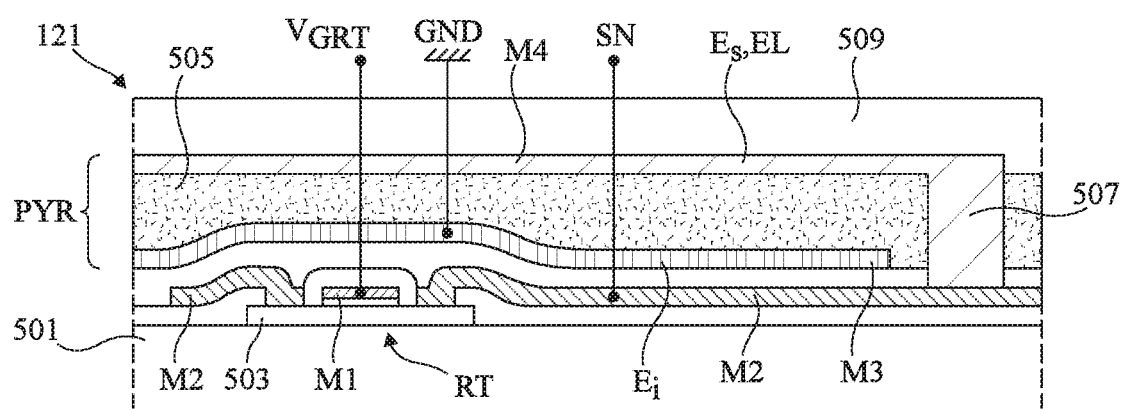
FIG. 5 is a cross-section view illustrating another more detailed embodiment of a pyroelectric print sensor of the type described in relation with FIG. 2.

FIG. 5 is a cross-section view illustrating another more detailed embodiment of cell 121 of the sensor of FIG. 2. More particularly, FIG. 5 shows pyroelectric element PYR, node SN, electrode EL, and reset transistor RT of the cell. In this drawing, transistors SF and RD of the cell have not been shown.

In the example of FIG. 5, cell 121 is formed in TFT technology on a dielectric substrate 501, for example, made of glass. A local layer 503 made of a semiconductor material, for example, polysilicon, is arranged above the upper surface of substrate 501. Transistor RT, as well as transistors SF and RD (not shown), are formed inside and on top of semiconductor layer 503. In particular, the source and drain regions and the channel-forming regions of the cell transistors are formed in layer 503. Heating resistors, not shown, forming the heat source of the sensor, may also be formed in layer 503 (for example, one resistor per cell). As a variation, the heating resistors may be formed in a conductive layer of the structure, for example, in metallization level M4 described hereafter. The gate of transistor RT is formed in a first metallization level M1 topping layer 503 and separated from layer 503 by an insulating layer forming the gate oxide of transistor RT. The source and drain electrodes of transistor RT are formed in a second metallization level M2 topping level M1. Lower electrode $E_i$ of pyroelectric element PYR, connected to the node of application of reference potential GND, is formed in a third metallization level M3 topping level M2. This electrode is coated with a layer 505 of a pyroelectric material. Layer 505 is coated with upper electrode $E_s$ of pyroelectric element PYR, formed in a fourth metallization level M4. In this example, the second electrode (upper electrode) of pyroelectric element PYR is confounded with electrode EL and is connected to a source or drain electrode of transistor RT (level M2) by a via 507. The source or drain electrode of transistor RT connected to electrode EL defines sense node SN of the cell and is connected to the gate of transistor RD (not shown). An insulating layer 509 coats metallization level M4. Layer 509 forms the dielectric of the capacitor between electrode EL and the user's skin. The upper surface of layer 509 is intended to be placed in contact with the skin of which a print is desired to be acquired. As an example, layer 509 has a thickness smaller than or equal to 50 µm, and preferably smaller than or equal to 2 µm.

Specific embodiments have been described. Various alterations and modifications will occur to those skilled in the art. In particular, the described embodiments are not limited to the specific example of electric diagram of an elementary cell shown in FIG. 2. The described embodiments may particularly be adapted to elementary cells comprising a number of control transistors different from 3 or where the arrangement of the control transistors is different.

Further, the described embodiments are not limited to the specific examples of structures of elementary cells described in relation with FIGS. 4 and 5. It will be within the abilities of those skilled in the art to obtain the desired effect by providing other layouts of pyroelectric conversion element PYR and of electrode EL intended to form a capacitor with the user's skin. In particular, it will be within the abilities of those skilled in the art to provide layouts where electrode EL is not confounded with an electrode of pyroelectric conversion element PYR.

Further, it will be within the abilities of those skilled in the art to adapt the described embodiments to conversion elements other than pyroelectric conversion elements. As an example, in the described embodiments, pyroelectric element PYR may be replaced with a photoelectric conversion element, for example, a photodiode (for example, of PIN type). In this case, electrode EL intended to form a capacitor with the user's skin may be connected to one of the electrodes of the photoelectric conversion element. Preferably, electrode EL is then connected to amplify the voltage level difference on sense node SN between a cell topped with a ridge of the skin and a cell topped with a valley of the skin. In particular, electrode EL may be connected so that the presence of a valley generates more electric charges than the presence of a ridge, to benefit from the voltage decrease simultaneously caused by the addition of an electric capacitance and from the charge decrease generated by the proximity of the skin in the case of a ridge.

What is claimed is:

1. A print sensor comprising a plurality of elementary acquisition cells arranged inside and/or on top of a substrate, each cell comprising:
   a pyroelectric conversion element comprising first and second electrodes separated by a layer of a pyroelectric material, the first electrode being connected to a node of application of a reference potential of the sensor, and the second electrode being connected to a sense node of the cell; and
   an electrode intended to form a capacitor with a user's skin, connected to the sense node and coated with a dielectric layer,
   wherein, in each cell, the electrode intended to form a capacitor with a user's skin is arranged on the side of the pyroelectric layer opposite to the substrate.

2. The sensor of claim 1, wherein, in each cell, the electrode intended to form a capacitor with a user's skin is arranged so that only the dielectric layer separates this electrode from a surface of the sensor intended to be placed in contact with a user's skin.

3. The sensor of claim 1, wherein, in each cell, the electrode intended to form a capacitor with a user's skin is connected to the sense node via a conductive via crossing the pyroelectric layer.

4. The sensor of claim 1, wherein the dielectric layer has a thickness smaller than 50 µm and preferably smaller than 2 µm.

5. The sensor of claim 1, wherein the second electrode and the electrode intended to form a capacitor with a user's skin form one and the same electrode.

6. The sensor of claim 1, wherein the second electrode and the electrode intended to form a capacitor with a user's skin are different electrodes.

7. The sensor of claim 1, wherein, in each cell, the first electrode is connected to a network of conductive tracks arranged on the side of the pyroelectric layer opposite to the substrate via a conductive via crossing the pyroelectric layer.

8. The cell of claim 1, wherein each cell further comprises a reset transistor coupling the sense node to a node of application of a reset potential.

9. The sensor of claim 1, wherein, in each cell, the sense node is coupled to an output track of the cell via a transistor assembled as a follower source and a readout transistor.

10. The sensor of claim 1, further comprising a controllable heat source.

11. A print sensor comprising a plurality of elementary acquisition cells arranged inside and/or on top of a substrate, each cell comprising:
- a pyroelectric conversion element comprising first and second electrodes separated by a layer of a pyroelectric material, the first electrode being connected to a node of application of a reference potential of the sensor, and the second electrode being connected to a sense node of the cell; and
- an electrode intended to form a capacitor with a user's skin, connected to the sense node and coated with a dielectric layer, wherein, in each cell, the electrode intended to form a capacitor with a user's skin is arranged so that only the dielectric layer separates this electrode from a surface of the sensor intended to be placed in contact with a user's skin.

12. A print sensor comprising a plurality of elementary acquisition cells arranged inside and/or on top of a substrate, each cell comprising:
- a pyroelectric conversion element comprising first and second electrodes separated by a layer of a pyroelectric material, the first electrode being connected to a node of application of a reference potential of the sensor, and the second electrode being connected to a sense node of the cell; and
- an electrode intended to form a capacitor with a user's skin, connected to the sense node and coated with a dielectric layer, wherein, in each cell, the electrode intended to form a capacitor with a user's skin is connected to the sense node via a conductive via crossing the pyroelectric layer.

* * * * *